United States Patent
Ostergaard

(10) Patent No.: US 12,526,265 B2
(45) Date of Patent: Jan. 13, 2026

(54) METHOD AND SYSTEM FOR INFLUENCING USER INTERACTIONS

(71) Applicant: HonestyPledge GmbH, Basel (CH)

(72) Inventor: Dan Ostergaard, Oberwil (CH)

(73) Assignee: HonestyPledge GmbH, Basel (CH)

( * ) Notice: Subject to any disclaimer, the term of this patent is extended or adjusted under 35 U.S.C. 154(b) by 280 days.

(21) Appl. No.: 18/547,415

(22) PCT Filed: Feb. 24, 2022

(86) PCT No.: PCT/EP2022/054636
§ 371 (c)(1),
(2) Date: Aug. 22, 2023

(87) PCT Pub. No.: WO2022/180157
PCT Pub. Date: Sep. 1, 2022

(65) Prior Publication Data
US 2024/0129284 A1  Apr. 18, 2024

(30) Foreign Application Priority Data
Feb. 26, 2021  (CH) .................................... 00206/21

(51) Int. Cl.
*H04L 9/40* (2022.01)
*G06F 21/64* (2013.01)

(52) U.S. Cl.
CPC .............. *H04L 63/08* (2013.01); *G06F 21/64* (2013.01)

(58) Field of Classification Search
CPC ..... H04L 63/08; H04L 63/107; H04L 63/108; H04L 63/14; G06F 21/64;
(Continued)

(56) References Cited

U.S. PATENT DOCUMENTS 6,104,796 A * 8/2000 Kasrai ................. H04M 3/4228
379/201.12
6,788,788 B1 * 9/2004 Kasahara ................ H04L 9/083
380/279

(Continued)

FOREIGN PATENT DOCUMENTS

WO  2016/060738 A1  4/2016

OTHER PUBLICATIONS

International Search Report Corresponding to PCT/EP2022/054636 mailed Jun. 8, 2022.
(Continued)

*Primary Examiner* — Aravind K Moorthy
(74) *Attorney, Agent, or Firm* — GRAESER ASSOCIATES INTERNATIONAL INC; Dvorah Graeser

(57) ABSTRACT

The invention relates to a computer-implemented method of pre-processing a user access request to an online communications session. The method comprises of the steps of transferring (62) the user to a pre-communication session, communicating (64) an honesty primer (70, 80) to the user, the honesty primer (70, 80) includes at least a message and/or action and/or exercise and transferring (69) the user to the communication session. The method further comprises the steps of determining (61) a first integrity indicator ($\lambda 1$) of a user sending an access request to a communication server before transferring the user to the pre-communication session, especially based on metadata of the access request and in particular selecting (63) and/or adapting an honesty primer (70, 80) based on the first integrity indicator ($\lambda 1$), and in particular determining a second integrity indicator ($\lambda 2$) based on adjustment parameters ($\delta(\lambda)$) of the honesty primer (70 80). In particular, the first integrity indicator ($\lambda 1$) is determined based on reliability parameters of the metadata, which include at least one of geolocation, browser language, time, interaction with previous pre-communication and/or (Continued)

communication sessions, integrity indicators (λ) of previous pre-communication sessions and/or communication sessions. Additionally or alternatively to the step of determining a first integrity indicator, the method comprises the steps of analyzing (66) user interaction with the pre-communication session, especially with the honesty primer (70,80), in particular analyzing response behavior parameters of the user in the pre-communication session and/or adjustment parameters (δ(λ)) of the honesty primers (70,80) and/or user response content and determining (67) a third (λ3) integrity indicator based on the analysis.

16 Claims, 8 Drawing Sheets

(58) Field of Classification Search
CPC ..... G06F 2221/2103; G06F 2221/2133; G06F 21/566; G06F 21/577; G06F 21/316; G06N 20/00; H04W 12/66; H04W 12/68; H04W 12/72
See application file for complete search history.

(56) References Cited

U.S. PATENT DOCUMENTS

| | | | | |
|---|---|---|---|---|
| 7,526,470 | B1* | 4/2009 | Karnawat | G06F 16/2457 707/999.005 |
| 8,145,560 | B2* | 3/2012 | Kulkarni | G06Q 40/03 379/189 |
| 8,271,899 | B1* | 9/2012 | Blackburn | G06F 3/046 715/811 |
| 8,370,926 | B1* | 2/2013 | Satish | G06F 21/36 726/19 |
| 8,838,522 | B1* | 9/2014 | Brundage | G06N 5/04 706/54 |
| 9,049,590 | B1* | 6/2015 | Hirschman | H04M 15/7652 |
| 9,536,191 | B1* | 1/2017 | Arel | G06N 20/00 |
| 10,015,171 | B1* | 7/2018 | Vardy | H04L 63/102 |
| 10,091,180 | B1 | 10/2018 | Moritz et al. | |
| 10,210,183 | B2* | 2/2019 | Chang | G06F 16/58 |
| 10,346,900 | B1* | 7/2019 | Wilson | G06F 8/38 |
| 10,486,649 | B1* | 11/2019 | Bennie | B60R 25/1004 |
| 10,491,582 | B1* | 11/2019 | Rule | G06F 40/40 |
| 10,872,345 | B1* | 12/2020 | Walters | G06Q 20/4093 |
| 10,951,509 | B1* | 3/2021 | Liu | H04L 43/12 |
| 11,128,373 | B1* | 9/2021 | Podmore | H04B 10/112 |
| 11,176,466 | B2* | 11/2021 | Neogi | G06N 5/022 |
| 11,178,168 | B1* | 11/2021 | Lin | H04L 63/1433 |
| 11,593,677 | B1* | 2/2023 | Nagarajan | G06N 5/04 |
| 11,663,675 | B1* | 5/2023 | Estes | G06Q 20/401 705/4 |
| 11,722,493 | B2* | 8/2023 | Urata | H04L 63/105 726/4 |
| 2003/0208681 | A1* | 11/2003 | Muntz | G06F 21/6209 713/179 |
| 2005/0176438 | A1* | 8/2005 | Li | H04W 12/088 455/450 |
| 2006/0010486 | A1* | 1/2006 | Lu | H04L 69/24 726/4 |
| 2006/0171376 | A1* | 8/2006 | Schwarz | H04W 36/0011 370/352 |
| 2006/0229063 | A1* | 10/2006 | Koch | H04M 3/4931 455/418 |
| 2007/0079113 | A1* | 4/2007 | Kulkarni | H04W 48/08 713/150 |
| 2007/0124541 | A1* | 5/2007 | Lang | G16H 10/60 711/137 |
| 2007/0136601 | A1* | 6/2007 | Kwon | H04L 63/08 713/182 |
| 2007/0230399 | A1* | 10/2007 | Oswal | H04W 36/322 370/331 |
| 2008/0091978 | A1* | 4/2008 | Brodsky | G06F 11/3466 714/38.14 |
| 2008/0151817 | A1* | 6/2008 | Fitchett | H04W 28/20 370/329 |
| 2009/0113005 | A1* | 4/2009 | Gregg | H04M 3/42017 709/206 |
| 2010/0169418 | A1* | 7/2010 | Whynot | H04W 4/02 709/204 |
| 2011/0286584 | A1* | 11/2011 | Angel | H04M 3/42221 379/88.02 |
| 2012/0124074 | A1* | 5/2012 | Sharma | G06F 11/3672 707/769 |
| 2012/0166561 | A1* | 6/2012 | Kelly | G06F 9/00 709/217 |
| 2013/0226812 | A1* | 8/2013 | Landrok | G06Q 20/40145 705/67 |
| 2014/0300922 | A1* | 10/2014 | Shaheen | H04N 1/00214 358/1.14 |
| 2014/0317713 | A1* | 10/2014 | Gadotti | G06F 21/36 726/7 |
| 2014/0359709 | A1* | 12/2014 | Nassar | H04L 65/1083 726/4 |
| 2014/0366111 | A1* | 12/2014 | Sheller | G06F 21/316 726/7 |
| 2015/0092737 | A1* | 4/2015 | Damodaran | H04W 8/22 370/329 |
| 2015/0163743 | A1* | 6/2015 | Narasimha | H04W 52/0254 370/311 |
| 2015/0199379 | A1* | 7/2015 | Thierer | G06F 16/14 707/724 |
| 2015/0312392 | A1* | 10/2015 | Smereka | H04M 19/04 455/415 |
| 2015/0381543 | A1* | 12/2015 | Hong | G06Q 30/02 709/203 |
| 2016/0078474 | A1* | 3/2016 | Wandler | G06Q 30/0246 705/14.45 |
| 2016/0086194 | A1* | 3/2016 | Chugh | G06Q 30/0185 705/318 |
| 2016/0117673 | A1* | 4/2016 | Landrok | G06Q 20/409 705/71 |
| 2016/0275413 | A1* | 9/2016 | Shi | G06N 20/00 |
| 2016/0307201 | A1 | 10/2016 | Turgeman et al. | |
| 2017/0032279 | A1* | 2/2017 | Miserendino | G06N 5/04 |
| 2017/0048703 | A1* | 2/2017 | McCann | H04L 63/0884 |
| 2017/0093867 | A1* | 3/2017 | Burns | H04L 63/107 |
| 2017/0104875 | A1* | 4/2017 | Im | H04M 3/42221 |
| 2017/0118767 | A1* | 4/2017 | Lee | H04W 4/80 |
| 2017/0147795 | A1* | 5/2017 | Sardesai | G06F 21/41 |
| 2017/0163607 | A1* | 6/2017 | Skuratovich | H04L 65/1045 |
| 2017/0187639 | A1* | 6/2017 | Hodroj | H04L 47/41 |
| 2017/0359365 | A1* | 12/2017 | van den Berg | H04W 4/20 |
| 2018/0024639 | A1* | 1/2018 | Creamer | G06F 3/011 382/103 |
| 2018/0174055 | A1* | 6/2018 | Tirumale | H04L 51/04 |
| 2018/0212931 | A1* | 7/2018 | Zhou | G06Q 30/0609 |
| 2018/0212981 | A1* | 7/2018 | Little | H04W 12/37 |
| 2018/0218175 | A1* | 8/2018 | Bender | G06F 21/316 |
| 2018/0225279 | A1* | 8/2018 | Cruz Huertas | G06F 40/30 |
| 2018/0260086 | A1* | 9/2018 | Leme | G06F 40/174 |
| 2018/0295089 | A1* | 10/2018 | Patil | H04L 51/52 |
| 2018/0300776 | A1* | 10/2018 | Yost | G06Q 30/0283 |
| 2018/0307717 | A1* | 10/2018 | Moysi | H04L 67/56 |
| 2018/0343250 | A1* | 11/2018 | Tang, Jr. | H04L 63/123 |
| 2018/0376526 | A1* | 12/2018 | Duncan | H04W 12/66 |
| 2019/0251000 | A1* | 8/2019 | Achar | G06F 11/1456 |
| 2019/0260786 | A1* | 8/2019 | Dunn | H04L 51/42 |
| 2019/0311367 | A1* | 10/2019 | Reddy | G06Q 20/4016 |
| 2019/0386969 | A1* | 12/2019 | Verzun | G06F 21/606 |
| 2020/0036620 | A1* | 1/2020 | Willshire | H04L 51/214 |
| 2020/0036761 | A1* | 1/2020 | Weinwurm | G06F 16/9535 |
| 2020/0082937 | A1* | 3/2020 | Bodurka | H04W 4/80 |
| 2020/0112560 | A1* | 4/2020 | Hunt | G06F 21/31 |
| 2020/0162255 | A1* | 5/2020 | Hunt | H04L 63/083 |
| 2020/0231466 | A1 | 7/2020 | Lu et al. | |
| 2020/0259779 | A1* | 8/2020 | Liu | H04L 51/10 |
| 2020/0293638 | A1* | 9/2020 | Rose | H04L 63/1425 |
| 2020/0322480 | A1* | 10/2020 | Sena, Jr. | H04M 3/42042 |

(56) References Cited

U.S. PATENT DOCUMENTS

| | | | |
|---|---|---|---|
| 2020/0334639 A1* | 10/2020 | Ramakrishnan | H04L 51/08 |
| 2020/0356379 A1* | 11/2020 | Gopisetti | G06N 3/08 |
| 2021/0006706 A1* | 1/2021 | Koci | G03B 17/56 |
| 2021/0014064 A1* | 1/2021 | Channa | H04L 63/0876 |
| 2021/0029164 A1* | 1/2021 | Albero | H04L 63/20 |
| 2021/0042314 A1* | 2/2021 | Batlle | G06F 16/22 |
| 2021/0051294 A1* | 2/2021 | Roedel | G06F 21/6245 |
| 2021/0081816 A1* | 3/2021 | Klimov | G06N 20/00 |
| 2021/0097176 A1* | 4/2021 | Mathews | G06N 5/01 |
| 2021/0118234 A1* | 4/2021 | Angelopoulos | G06T 19/006 |
| 2021/0127436 A1* | 4/2021 | Smets | H04W 76/11 |
| 2021/0158835 A1* | 5/2021 | Hill | G10L 21/10 |
| 2021/0160335 A1* | 5/2021 | Bellet | G06F 9/543 |
| 2021/0174241 A1* | 6/2021 | Mishra | G06N 20/00 |
| 2021/0184877 A1* | 6/2021 | Blum | H04N 21/6582 |
| 2021/0243017 A1* | 8/2021 | Ravi | H04L 9/0825 |
| 2021/0303655 A1* | 9/2021 | Lipka | G06F 16/986 |
| 2021/0334467 A1* | 10/2021 | Wan | G06N 20/10 |
| 2021/0406369 A1* | 12/2021 | Healy | G06F 21/562 |
| 2021/0406727 A1* | 12/2021 | Wang | G06N 5/04 |
| 2022/0012632 A1* | 1/2022 | Vasisht | G06N 20/00 |
| 2022/0062761 A1* | 3/2022 | Dohan | A63F 13/537 |
| 2022/0094699 A1* | 3/2022 | Birur | H04L 63/1416 |
| 2022/0130398 A1* | 4/2022 | Coman | G06F 40/35 |
| 2022/0239569 A1* | 7/2022 | Wu | H04L 41/0677 |
| 2022/0245489 A1* | 8/2022 | Rodriguez | G06F 40/295 |
| 2022/0277219 A1* | 9/2022 | Tora | G06N 3/10 |
| 2024/0113990 A1* | 4/2024 | Palraj | G06Q 50/01 |

OTHER PUBLICATIONS

Written Opinion Corresponding to PCT/EP2022/054636 mailed Jun. 8, 2022.

* cited by examiner

METHOD AND SYSTEM FOR INFLUENCING USER INTERACTIONS

The invention relates to the field of online systems for influencing user interactions. In particular, it relates to methods of determining or enhancing the integrity of user requests for access to a communications session.

With the establishment of the internet as the main way of conducting business, internet security issues are more prevalent today than ever. This does not only relate to stopping people from hacking or the spread of viruses, but also to stopping fraud. For example, insurance fraud remains a significant challenge costing the industry $100 billion per year.

Honesty in communications online is critical to promote and maintain trust in business, public administration and society at large, as most people rely on online interactions for personal and professional aspects of their daily lives. Moreover businesses and institutions rely on online interactions for achieving their purpose.

As examples hereof, online stores rely on honesty to ensure fair use of their products or services. Insurance and logistics companies rely on honesty for policy underwriting and claims. Review platforms and their users rely on honesty in the feedback and judgment of products and services. Employers and educational institutions rely on honesty in processes for exams, applications, reporting and documentation. Governments rely on honesty in processes for tax, social benefits, and business administration. Retailers rely on honesty for their self-checkout systems. Social media channels rely on honesty to guarantee trustworthy communications. Corporations rely on honesty in processes related to financial administration such as expense management, as well as risk assessments, misconduct reporting and employee surveys.

However, the prevalence of dishonesty in online transactions undermines the trust required above. It creates transaction costs, need for resources to prevent, detect and sanction such dishonesty, and establishes technical and non-technical barriers that have to be addressed, and which forms the basis and the purpose of the invention.

There have been many ways online service providers are using to stop fraud: Online service providers which interact with their users over uncontrolled networks such as the internet typically attempt to deny access to unauthorized users. In addition, they may deploy a surveillance algorithm to detect patterns of fraudulent or unauthorized user interactions with the server.

Today's efforts to reduce such fraud are based on fraud detection after claims, reviews or reports have been made. In claims, the focus is on large or suspicious claims made by customers. Detection of fraudulent transactions may be implemented using expert or machine learning systems which can be trained to trawl historical user transaction data to recognize potentially fraudulent patterns of user interaction. Some examples are as follows:

An email service provider may monitor its incoming email to detect network traffic patterns which indicate clandestine routing of spam.

An insurance claim processing server may deploy a pattern recognition algorithm to detect implausible patterns of data entered in online claim forms.

An online dating website may implement automated reference checks on newly signed-up customers using databases of verified electoral or residence data.

A web-server's security portal may batch-process its transaction data during server CPU idle time to identify IP addresses suspected of routing access to the server via a man-in-the-middle attack.

However, the vast majority of fraudulent claims are neither large, nor suspicious and therefore largely impossible to detect, leaving only around 10% of fraudulent claims detected. Insurers do not even investigate the small claims (typically <$1,500) due to difficulty and high costs, but simply pay out compensation automatically, in a market where claim handling speed has become a competitive factor.

Therefore, it is necessary to provide preventative measures to reduce fraudulent behavior.

The preventative measures taken today typically involve challenging a user requesting access to provide pre-issued authentication or identity credentials, or may require the user to supply independently verifiable identification such as an email address.

Known access-control techniques thus typically attempt to prevent an ill-intentioned user from accessing the communications session, or they aim to identify unwanted transaction patterns in the communications session. Arrangements for preventing unauthorized access typically require all users to register or obtain access credentials before accessing the system, and all users are presented with a standard sequence of security challenges. In order to provide enhanced security, the user may be asked to provide some personal or other identification information. Such access control may require multiple interactions by the user, and require the user to enter information such as passwords or identification data which he or she does not have to hand, or that he or she would prefer not to divulge. For genuinely well-intentioned users, such security measures are a hindrance and an inconvenience, and may induce antipathy in some users who finally access the communications system. On the other hand, standard authentication challenges may be insufficient to prevent malicious users from gaining access. Thus, a monitoring algorithm may be deployed to detect unwanted (e.g. abusive or fraudulent) patterns of user interaction with the communications session. For security reasons, the functioning of such access control and fraud detection processes is kept secret and is uniquely customized to the provider of each particular communications session.

There is therefore a need for a method of providing access to an online communications session, which minimizes the number and intrusiveness of the interactions for well-intentioned users, while nevertheless deterring or detecting malicious interactions and/or prime the truthfulness of the user such that the user is more likely to provide a true answer. Further, there is a need for an online communications session, which can be used to provision access by anonymous users, and which can be implemented as a standalone application, separate from the communications session for ease of use in existing processes.

The present invention aims to overcome the disadvantages of the prior art. To this end, the invention foresees a method according to claim 1, a system according to claim 13 and a computer program product according to claim 14. Further variants of the invention are described in the dependent claims.

The problems are solved by a computer-implemented method, a method for training a self-learning computer program structure, a data processing system, a computer program product and a computer-readable medium according to the independent claims.

Especially, the object is solved by a computer-implemented method of pre-processing a user access request to an online communications session. The method comprises the steps of:

Transferring (62) the user to a pre-communication session,

Communicating (64) an honesty primer (70, 80) to the user, the honesty primer (70, 80) includes at least a message and/or action and/or exercise, Transferring (69) the user to the communication session, Wherein the method comprises the steps Before transferring the user to the pre-communication session, determining (61) a first integrity indicator ($\lambda_1$) of a user sending an access request to a communication server especially based on metadata of the access request, in particular, the first integrity indicator ($\lambda_1$) is determined based on reliability parameters of the metadata, which include at least one of geolocation, browser language, time, Interaction with previous pre-communication and/or communication sessions Integrity indicators ($\lambda$) of previous pre-communication sessions and/or communication sessions In particular selecting (63) and/or adapting an honesty primer (70, 80) based on the first integrity indicator ($\lambda_1$), and in particular determining a second integrity indicator ($\lambda_2$) based on adjustment parameters ($\delta(\lambda)$) of the honesty primer (70 80), And/or the steps Analyzing (66) user interaction with the pre-communication session, especially with the honesty primer (70, 80), in particular analyzing response behavior parameters of the user in the pre-communication session and/or adjustment parameters ($\delta(\lambda)$) of the honesty primers (70,80) and/or user response content, Determining (67) a third ($\lambda_3$) integrity indicator based on the analysis.

This method uses honesty primers, i.e. messages, actions or exercises to influence user honesty before the actual communication session. It has been shown, that honesty primers such as messages provided before an actual communication session for insurance claims reduce dishonesty in the communication session by 40%. Thus, this method allows for easily reducing the large number of small undetectable dishonest claims, which represent around 90% of fraudulent claims in insurance, easily and without great investments.

Honesty primers may be messages, actions, and exercises. Messages may include images and/or icons and/or texts. The exercise may include a slider and/or a puzzle and/or other types of user input format for the user to interact with. The action may be playing a video and/or audio clip, animated pictures, etc. The honesty primers may be stored in a database. Especially, each honesty primer is stored as part of an access prompt. In this case, each access prompt may comprise an indication of the expected user response and/or an adjustment parameter for adjusting the integrity indicator. Especially, the adjustment parameter may adjust the value of the integrity indicator based on the actual user response, in particular a comparison of the actual user response to the expected user response.

The determination of the first integrity indicator allows to easily adapting honesty primers to positive or negative interaction patterns correlating with the reliability parameters. Here, negative interaction patterns are patterns indicating less honest interactions with a communication session, such as faster sliding speed of a slider than 70% of users. This allows for better influencing the actions of the users by using specific honesty primers adapted to the user. In addition, messages may be displayed in the language of the browser.

As this method uses a pre-communication session for this effect, the method may be easily integrated in various processes. Especially, the method may be used for ensuring more honesty in various places where money, reputation or data analysis are involved. Specifically, the method may be used to ensure money claims, payments and returns are made sincerely. For example, the method may be used in government for more honest tax returns and less cheating in all type of grants like COVID-19 relief, in retail for less cheating of the self-checkout systems, in corporations for more honesty in expense reports and in logistics for orders and deliveries. Further, the method may be used to ensure honest answers and statements such as in whistleblowing for reducing bad faith reports, more honest CVs and job applications in recruitment, more honest reviews for products and services, less cheating in tests, exams as well as related to feedback in research studies. Thus, the method has a broad application variety. This method allows this, as it does not depend on the user identifying themselves, which is difficult to implement for example in self-checkout systems and it does improve honesty, without blocking people from access, which is important for example in providing product reviews.

The analysis of the metadata allows for an initial determination of an integrity indicator without the need of the user giving up personal information such as e-mail addresses, names etc.

The analysis of the reliability parameters relating to a pre-communication session and/or a communication session allows for a more precise determination of the integrity indicator.

The reliability parameter of "time" may relate to the time at which the access request is made, the time spent in a previous pre-communication session, the time spent before and/or on and/or after an exercise in a previous pre-communication session, the time spent in the pre-communication session, time spent before continuing to the communication session. The time spent before an exercise may point to a hesitation in agreeing to act with integrity. Time spent after an exercise may point to a hesitation to continue acting with integrity.

The reliability parameter of "interaction" with a previous pre-communication session and/or communication session, may relate any one or more of the following interactions: the user leaving the pre-communication or the communication session any time or at certain points in the process, such as before and/or after an exercise and/or before filing requests, the user not continuing to the communication session or stopping the communication session etc. These also apply for the analysis of interactions with the pre-communication session, especially the honesty primer. Thus, the analysis of the interaction with the honesty primer may be primarily related to time spent before interaction, time interacting with the honesty primer and time spent after the honesty primer while still in the pre-communication session. The user interaction with the pre-communication session provides a more individual analysis basis and thus is more precise for the determination, if access to the communication session should be granted to the specific user. Thus, the user interactions are crucial for a more precise determination of the user honesty.

The pre-communication session is adapted depending on the second integrity indicator to allow for further influencing a user if the integrity indicator of the user shows potential of dishonesty of the user. But it also allows for showing the user an acknowledgement of their honesty if the integrity indicator shows potential for greater honesty.

The adaptation of the honesty primer or primers may especially be in regards to at least one of
 content of the honesty primer or primers
 the frequency of honesty primers
 number of honesty primers
 interaction time with the honest primers
 the type of honesty primers
 sequence of communication of honesty primers.

The content of the honesty primers may be adapted according to time of the access request. For example, the honesty primer may be more elaborate, such as a message and an exercise, at a time of day, when more fraudulent claims are expected. The messaging may also be adapted to geolocation, as different cultures tend to react more to different kinds of messaging, such as messaging to induce feeling observed, instructed by a superior and/or invited to be more honest.

Preferably, the method comprises the steps of:
 Determining an integrity score based on the first integrity indicator and/or second integrity indicator and/or third integrity indicator,
 Based on the second integrity indicator and/or third integrity indicator, adapting the pre-communication session, especially adapting the honesty primer and/or transferring the user to the communication session if an integrity score meets a predetermined condition.

Preferably, the communication speed of the user with the communication session is adapted based on the integrity indicator or the integrity score. Thus, a user determined to be more honest may be routed more quickly to the communication session. Thus, the intrusiveness of the pre-communication session on honest users is minimized, while still instilling more honesty in the users.

Specifically, the adjustment parameters may be used to calculate the second integrity indicator and the response behavior parameters may be used to calculate the third integrity indicator. The determination of the integrity score may be based on the third integrity indicator and/or a difference between the second and the third integrity indicator and/or identifiers of the honesty primer presented to the user and/or the content of the user response and/or behavior parameter of the user response.

In particular, when adapting the honesty primer and/or the display of the honesty primer, the comparison with other users may be used in the honesty primer to indicate to the user whether they display positive or negative interaction patterns and thus influence the user for more honest behavior.

The response behavior parameters are parameters of the user response in the pre-communication session. Such parameters may for example be user response time, time delay, leaving the pre-communication session etc. within the pre-communication session.

The adjustment parameters of the honesty primer are parameters which are paired with a specific honesty primer. For example, the honesty primer of an exercise like a slider may be paired with an adjustment parameter of a slide speed. Thus, the speed of the user sliding may be faster than the threshold. The pre-communication session may be adapted to then reset the slider and display an additional message to the user with the instruction to slow down the slide speed.

In another example, a video may be displayed and the adjustment parameter paired with the video may be in regards of if and when the user stops the video. Thus, the user may stop the video after only two seconds, not meeting the threshold of watching the video for at least 3 seconds. The pre-communication session may be adapted to then load a different video or a puzzle for the user to solve.

Preferably, the method comprises the steps of
 Analyzing the interaction of the user with the adapted honesty primer, in particular analyzing response behavior parameters of the user in the pre-communication session and/or adjustment parameters of the honesty primers and/or user response content.
 Determining a fourth integrity indicator and/or fifth integrity indicator based on the analysis.
 Analyzing the first integrity indicator and/or the second integrity indicator and/or the third integrity indicator and/or a fourth integrity indicator and/or fifth integrity indicator.
 Determining an integrity score based on the analysis and only in case of the integrity score meeting a predetermined condition, transferring the user to the communication session.

This allows for an easy analysis, if the user adapted to the honesty primer and thus is influenced by the honesty primer.

The method may comprise several, in particular 5-10, iterations of presenting an, especially adapted, honesty primer, if the integrity score does not meet a predetermined condition.

Preferably, the method comprises the steps of
 Analyzing of apps and/or widgets and/or plugins and/or other software used by the user.
 Adapting the analysis of the reliability parameters, and/or the determination of the integrity indicator, and/or the presentation or content of the honesty primer based on this analysis.

This allows for more precision in the analysis. For example, people who use apps for reading a webpage aloud, such as slow readers or people with visual impairments, may need more time for reading messages. This also allows the use of different honesty primers, which may be compatible with software and/or hardware used.

Preferably, the method may comprise the steps of
 Collecting sensor data, especially camera and/or microphone data.
 Analyzing the sensor data as integrity parameters.

This allows for improving the determination of honesty of the user. The sensor data may contain data of eye movements, facial expressions etc. which are used to determine the honesty of the user.

Preferably, the method comprises the steps of:
 Providing a database of access prompts, each access prompt comprising an honesty primer, an indication of an expected user response and an adjustment parameter for adjusting an integrity indicator.
 Selecting one or more access prompts of the data base based on the first integrity indicator.

Preferably, the method comprises the steps of:
 Providing a self-learning computer program structure for analyzing reliability parameters and/or adjustment parameters and/or response behavior parameters and/or user response content and/or security parameters, especially for analyzing user interactions with communication sessions, especially a trained self-learning computer program structure.
 Analyzing reliability parameters and/or adjustment parameters and/or response behavior parameters and/or user response content and/or security parameters, especially user interaction history with at least one communication session, by the self-learning computer program structure, Determining the first integrity indicator of the user by the self-learning computer program structure based on the analysis, In particular, sending the determined first integrity indicator to a communication server with the access request, Selecting and/or adapting the one or more honesty primers based on the analysis by the self-learning computer program structure.

This allows easily adapting the determination of the first and second integrity indicators based on larger patterns displayed by multiple users.

Preferably, the self-learning computer program structure is trained with predictor variables. The predictor variables is at least one of the metadata, historical values of the network locations, the geographical locations, the times of day, identifiers of access prompts presented, the user responses, the access integrity parameter and/or user responses, each response comprising a response content and one or more response behaviour parameters.

Preferably, the self-learning computer program structure may be trained continuously. The self-learning computer program structure may be trained with metadata of access requests, data of each pre-communication session and communication session. This allows the self-learning computer program structure to adapt the honesty primer more efficiently and effectively. Though it is not possible to know for each individual user initially, which honesty primer may be effective to influence their honesty, the self-learning computer program structure provides an initial assessment and strategy for the choice of honesty primers through data gathered from other user interactions. The continuous training of the model allows not only for adapting to individual user but also to refine the process of choosing and adapting the honesty primer for more effectiveness.

Further, each honesty primer may be paired with an associated adjustment parameter. The adjustment parameter determines the adjustment to the integrity indicator for showing the specific honesty primer to the user. This allows easily selecting an honesty primer for increasing the integrity indicator to the necessary level for access to the communication session. The self-learning computer program structure may be programmed to adapt the adjustment parameter based on positive and/or negative interaction patterns. Thus, if a positive interaction pattern in correlation to a certain honesty primer is found by the self-learning computer program structure, the adjustment parameter may be adapted to indicate a higher increase in honesty due to the honesty primer.

Especially, the adaptation may be made for individual users based on the analysis of interactions of multiple other users.

In particular, the self-learning computer program structure may be trained to find positive and negative interaction patterns. The correlation between certain reliability parameters, such as time of day, geolocation etc., and verified claim or false review, allows for an easy initial assessment.

Preferably, the method comprises the following steps:

Analyzing user interactions with the pre-communication session, in particular with the honesty primer, by the self-learning computer program structure, especially analyzing reliability parameters and/or adjustment parameters and/or response behavior parameters and/or user response content.

Determining the third integrity indicator of the user by the self-learning computer program structure based on the analysis, Adapting the pre-communication session, in particular the honesty primer, according to the second and/or third integrity indicator, by the self-learning computer program structure and/or transferring the user to the communication session if the predetermined condition for access is met.

Specifically, this allows for adapting the pre-communication session more individually. For example, if the first integrity indicator suggests a more honest user, an honesty primer which is determined to increase honesty less but is also less intrusive may be chosen. If the first integrity indicator suggests a more dishonest user, an honesty primer may be chosen which is determined to increase honesty more but may also be more intrusive. The response content may be analyzed for inconsistent and/or implausible information provided. Security parameters relate to any parameters regarding attacks on communication servers, such as SQL injection, cross-site scripting and cross-site request forgery.

Preferably the method comprises the following steps:

Analyzing the interactions of multiple users with pre-communication sessions and/or communication sessions, especially for negative interaction patterns, by the self-learning computer program structure Based on this analysis determining the first integrity indicator of a single user.

Selecting an access prompt based on the first integrity indicator.

Communicating the honesty primer of the access prompt to the user.

This allows for a more precise initial assessment of the user honesty.

Preferably, the method comprises the following steps:

Receiving a content of a user response to the access prompt.

Determining a second integrity indicator based on the adjustment parameter of the access prompt and at least one of the first integrity indicator, a previous integrity indicator, and the content of the user response.

Determining a response behavior parameter of the user response, the response behavior parameter including a temporal characteristic of the user response, in particular a response delay, a total response time or a time-dependent response behavior pattern.

Determining a third integrity indicator based on the determined response behavior parameter.

Determining an integrity score based on at least one of the third integrity indicator, a difference between the second and the third integrity indicator, an identifier of the access prompt presented to the user, and the content or behavior parameter of the user response.

If the integrity score meets a predetermined condition, transferring the user access to the communications session.

Ending the pre-processing.

The problem is solved by a method for training a self-learning computer program structure, using the following steps:

Collecting data, in particular, the data collected contains a predictor variable and an honesty parameter. Especially, the predictor variable is at least one of time of day and geolocation.

Preparing data, in particular excluding missing data,

Training a supervised machine-learning algorithm, especially by using a first portion, in particular 50-70%, of the prepared data, Testing a model, especially by using a second portion, in particular 30-50%, of the data, Implementing the model.

Data collected may contain additionally or instead of the mentioned data variables which are shown in experiments to relate to honesty.

The predictor variables are variables which are used to predict honesty in a user. The honesty parameter is the outcome, whether the user was honest or dishonest. The combination of the predictor variables and the honesty parameter allows for an easy training of the machine-learning algorithm.

Testing the model using the data withheld during training, the model can be evaluated on data which it hasn't seen before. Here, the model accuracy, along with other performance metrics can be evaluated. At this point it may be decided, if more data is needed to increase the accuracy of the model. Thus, the method may comprise iterations of the first three steps, if the accuracy of the model is too low. When a sufficiently accurate model has been trained, the model state may be saved to be used during operation. Future re-training of the model may be done when more data becomes available. The algorithm may be tested via several experiments where variations of honesty primers, method of communications of the honesty primer and/or interactions with the honesty primer may be used as input data. This allows for an easy understanding of the match between input data and output data, being drop outs and fraudulent claims.

During the preparation of data, uncorrelated features and features which are the most predictive may be selected.

During the training, several models may be tested. In particular, a random forest, and a gradient boosting algorithm may be tested.

These are algorithms which are easy to implement, train, and test. These algorithms also provide probability for classification. For example, the output would be: honesty=76%, dishonesty=24%.

During implementation, new data may be collected of user interaction with the honesty primer. In this case, the same and/or different variables used to train the model may be collected and may be input into the trained model. The model then may calculate the output, along with a probability.

This data collection and model development strategy assumes the type of honesty primer remains constant. Thus, input data may be at least one of metadata and behavioral data. Metadata may comprise session start time, geo-location, browser language, device type, pre- and post pre-communication dropouts, session departure, financial claims data and user deemed suspicious due to claim size. Behavioral data may comprise time to start interaction with the honesty primer, time to complete interaction with the honesty primer, speed to redo session, speed to continue, as well as combinations of these when interventions are introduced. As an example, when a user is above average in terms of speed for speed to start and complete interaction, it may also be measured how this influences the following steps. Output data may be at least one of user honesty, dropout rates and disclosures after the pre-communication session such as average financial claim size identified during the communication session.

Alternatively, to include the type of honesty primers as a variable additional experiments may be carried out with varying types of honesty primers. In this case, experiments to statistically determine whether the pledge type influences the likelihood of honesty would be conducted. Furthermore, the effectiveness of a given type of honesty primer could be statistically quantified.

Preferably, the method may comprise the step of using an unsupervised learning algorithm to create features from inputs as discovery function.

In this case, the output targets of the previous supervised training will become inputs in the unsupervised learning model.

Preferably, the method may comprise the step of analyzing principal components.

This provides an easy way to weed out redundancy among predictors. This also provides insight into the variable selection process, contributing to the supervised predictive model.

The problem is also solved by a data processing system comprising means for carrying out the method as previously described.

The problem is also solved by a computer program product comprising computer-executable instructions for performing a method as previously described.

Finally, the problem is solved by a computer-readable medium comprising instructions which, when executed by a computer, cause the computer to carry out the method as previously described.

The problem is also solved by a computer-implemented method of pre-processing one or a plurality of user access requests to an online communications session. The method comprises the following steps providing a database of access prompts, each access prompt comprising an honesty primer, in particular a message, action and/or exercise, for the user and an indication of an expected user response;

each access prompt in the database comprises an adjustment parameter for adjusting an integrity indicator, in particular an integrity parameter adjustment parameter.

The method comprises: for the one or each of the access requests, determining a first integrity indicator, in particular a first value of an access integrity parameter, selecting a succession of the access prompts and, for each of a plurality of the access prompts, communicating the access prompt to the user;

receiving a content of a user response to the access prompt;

determining a second integrity indicator, in particular a first updated value of the access integrity parameter, based on the adjustment parameter and at least one of the first integrity indicator, a previous integrity indicator, and the content of the user response;

determining a response behavior parameter of the user response, the response behavior parameter including a temporal characteristic of the user response, in particular a response delay, a total response time or a time-dependent response behavior pattern;

determining a third integrity indicator, in particular a second updated value of the access integrity parameter, based on the determined response behavior parameter;

determining an integrity score, in particular a value of an integrity score parameter, based on at least one of the third integrity indicator, a difference between the second and the third integrity indicator, an identifier of the access prompt presented to the user, and the content or behavior parameter of the user response;

if the integrity score meets a predetermined condition, transferring the user access to the communications session and ending the pre-processing.

By using available, objectively verifiable data of each access request as reliability parameters to derive a first integrity indicator of the user, and by presenting honesty primers based on the first integrity indicator and adjusting the integrity indicator based on the content and temporal characteristics of the user's response, the method can be configured so that most users are able to proceed quickly to the communications session, while others with a lower integrity indicator pass through further iterations of prompts and responses. The method of the invention may advantageously be implemented using a machine learning model.

The integrity indicator is used as the value of the integrity parameter in the calculation of the access status. Therefore, here, "integrity indicator", "value of the integrity parameter" and "value of the access integrity parameter" are used interchangeably.

Preferably, the method comprises the step of receiving metadata of the user access request. The metadata includes at least an originating network location and/or a local time at a geographical location of the network location. The determining of the first integrity indicator, and/or the determining of an integrity indicator, is based on the metadata.

This allows for an easy way for a first display of an honesty primer prompt, such as by adapting language or signals to location.

Preferably, the method comprises the step of providing a machine learning model trained to predict any one or more of the integrity indicators, using as predictor variables: the metadata, user responses, each response comprising a response content and one or more response behavior parameters, and/or historical values of the network locations, the geographical locations, the times of day, identifiers of access prompts presented, the user responses, and/or the access integrity parameter.

This allows for better adaptation of the honesty primer prompts.

Preferably, the step of determining the first integrity indicator comprises using the machine learning model to determine the first integrity indicator, as the response variable, using the metadata as the predictors.

This allows for a quick initial classification of user honesty.

Preferably, the selection of the access prompts comprises adaptively selecting each access prompt based on the metadata and/or a current integrity indicator, and/or the said historical values.

This allows for easy adaptation of the honesty primer to a certain user and thus greater efficacy.

Preferably, the step of adaptively selecting each access prompt is performed using the machine learning model to predict which of the plurality of access prompt maximizes a difference between the integrity indicator before and after communicating the selected access prompt to the user device.

Preferably, the step of determining the second integrity indicator, comprises using the machine learning model to determine the second integrity indicator, as the response variable, using
the metadata,
the first integrity indicator, and/or the historical data as predictors.

This allows for an easy update to the first initial assessment of the user honesty.

Preferably, the step of determining the third integrity indicator, comprises using the machine learning model to determine the third integrity indicator, as the response variable, using
the metadata,
the first integrity indicator,
the second integrity indicator,
and/or the historical values
as predictors.

Preferably, the method comprises passing the second integrity indicator to the communications session.

Preferably, the method comprises using the machine learning model to determine the said predetermined condition.

Preferably, the temporal characteristic comprises an input timing pattern of the user response.

This allows for an easy comparison between users, and highlighting hesitation of response within a certain time frame or increased speed, which may indicate less honesty in a user.

Preferably, the method further comprises steps of a user authentication or registration process of the communications session.

The problems are also solved by a system for automatically pre-processing a plurality of user access requests to a communications session of a communications server. The system comprises:

Data store storing access prompts, each access prompt comprises a message for communicating to the user and an indication of an expected user response.

Each access prompt in the data store comprises an adjustment parameter for adjusting the integrity indicator, in particular an integrity parameter adjustment parameter.

The system comprises for each of the access requests: means configured to determine a first integrity indicator, in particular a first value of an access integrity parameter, to select a succession of the access prompts and to communicate the access prompt to the user for each of a plurality of the access prompts.

Means for receiving a content of a user response to the access prompt.

Means for determining a second integrity indicator, in particular a first updated value of the access integrity parameter, based on the adjustment parameter of the access prompt and at least one of first integrity indicator, a previous integrity indicator, and the content of the user response.

Means for determining a response behavior parameter of the user response. The response behavior parameter includes a temporal characteristic of the user response, in particular a response delay, a total response time or a time-dependent response behavior pattern.

Means for determining a third integrity indicator, in particular a second updated value of the access integrity parameter based on the determined response behavior parameter.

Means for determining an integrity score, in particular a value of an integrity score parameter, based on at least one of the third integrity indicator, a difference between the second and the third integrity indicator, an identifier of the access prompt presented to the user, and the content or behavior parameter of the user response.

The system comprises means for detecting the fulfilment of a predetermined condition, and means for transferring the user access to the communications session and end the pre-processing if the integrity score meets a predetermined condition.

This system allows for most users to proceed quickly to the communications session, while others with a lower integrity indicator pass through further iterations of prompts and responses. Thus, the intrusiveness is lowered, while still improving user honesty.

Preferably, the system comprises means configured to receive metadata of the user access request. The metadata includes at least an originating network location and/or a local time at a geographical location of the network location. The determination of the first integrity indicator and/or the integrity indicator is based on the metadata.

Preferably, the system comprises a machine learning model trained to predict an integrity indicator, using as predictor variables: the metadata, historical values of the network locations, the geographical locations, the times of day, identifiers of access prompts presented, the user responses, the access integrity parameter and/or user responses, each response comprising a response content and one or more response behavior parameters.

Preferably, the means of determining the first integrity indicator comprises means configured to use the machine learning model to determine the first integrity indicator as the response variable, using the metadata as the predictors.

The problems are solved by a computer program product comprising computer-executable instructions for performing the method as previously described. The instructions are stored in a nonvolatile storage medium.

Further, the problem is solved by a computer program product comprising instructions which, when the program is executed by a computer, cause the computer to carry out the method as previously described.

Finally, the problem is solved by a computer-readable medium comprising instructions which, when executed by a computer, cause the computer to carry out the method as previously described.

The invention will be described in detail with reference to the attached drawings, in which.

It should be noted that the figures are provided merely as an aid to understanding the principles underlying the invention, and should not be taken as limiting the scope of protection sought. Where the same reference numbers are used in different figures, these are intended to indicate similar or equivalent features. It should not be assumed, however, that the use of different reference numbers is intended to indicate any particular degree of difference between the features to which they refer.

Figure 1:
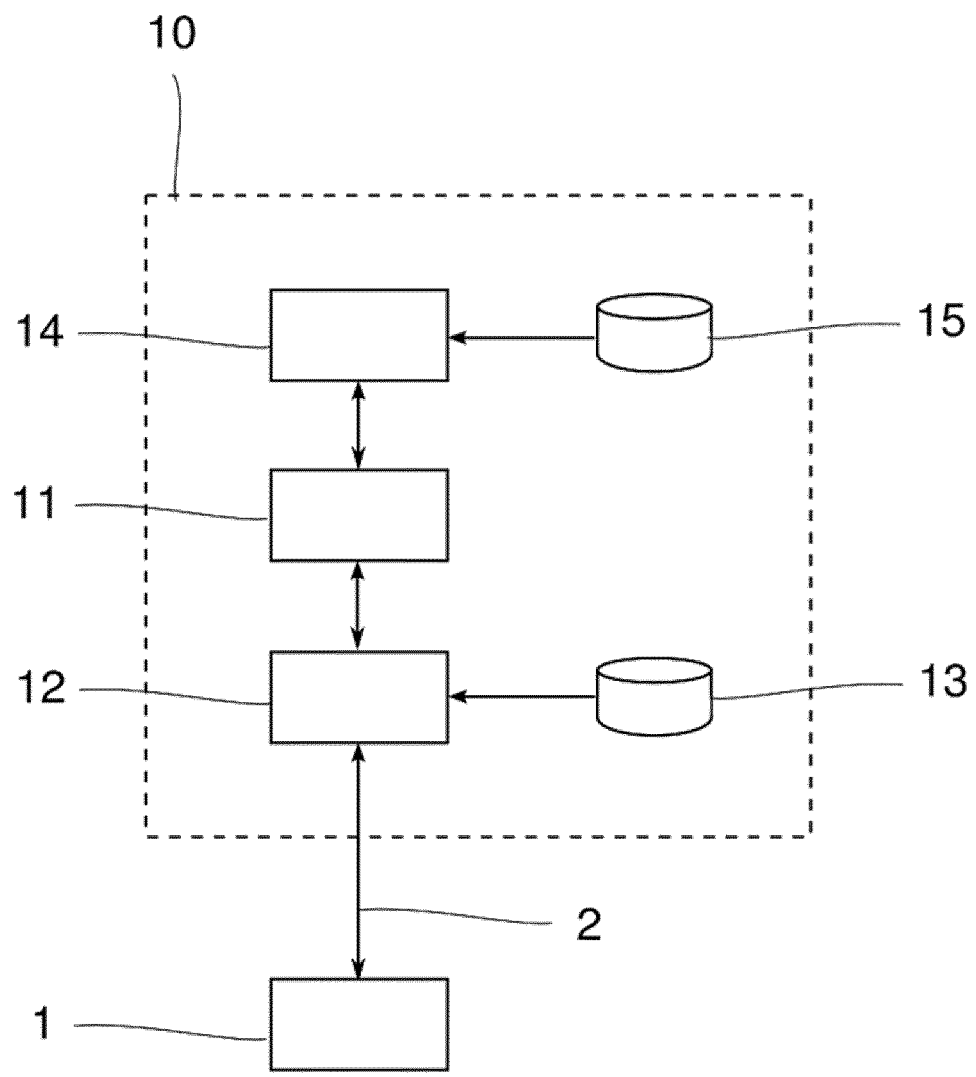
FIG. 1 shows a schematic view of a prior art access control system.

FIG. 1 shows in schematic view a system in which a user's device 1 (e.g. computer, tablet, smartphone etc.) requests access 2 to a communications session 11 running on a communications server 10. As discussed above, measures are deployed to ensure the integrity of the user's interaction with the communications session 11. The communications session may be any type of online service or interaction which is accessible over an unsecured network such as the internet, for example, and which requires a certain level of integrity from the user.

Firstly, the user's access request 2 is subjected to an authentication analysis, by reference to authentication information 13, to determine whether or not the user has the necessary privileges or credentials for accessing the communications session. Depending on the result of the authentication, access to the communications session 11 is either granted, or not granted, or granted on the basis of restricted privileges.

Secondly, the user's interaction history with the communication session is analyzed by a pattern recognition module 14, which searches the interaction history data of all users for patterns of unwanted user interactions based on rules stored in knowledge base 15. If unwanted user interaction patterns are detected, a suitable sanction (not discussed here) can be imposed on the particular user(s). Unwanted interaction patterns may include actual or attempted fraud, such as providing implausible or inconsistent information, or SQL injection or other attempts to breach security.

Figure 2:
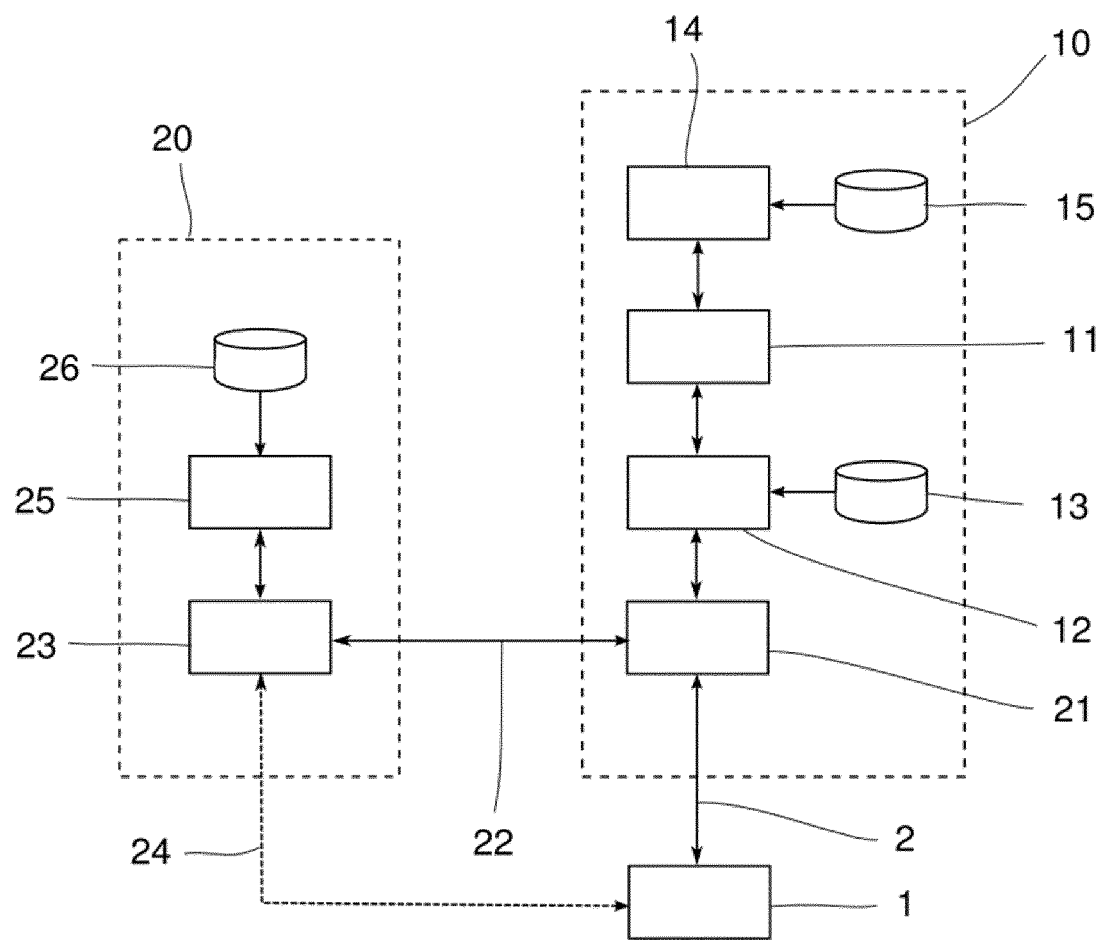
FIG. 2 shows a schematic view of a first example of a system according to the invention.

FIG. 2 shows the schematic of a first example of a system according to the invention. Here, the system of FIG. 1 is adapted with the addition of a pre-processing system or device. The pre-processing system or device initiates a pre-processing protocol with the user's device. The pre-processing protocol determines and enhances the integrity of the user's interaction with the communication session 11 in advance, before the user's access request to the communications session 11 is established. In addition, the pre-processing protocol includes presenting selected messages (so-called "nudges") and/or tasks, which are determined using machine learning to enhance the integrity of users' subsequent interactions with the communications session 11, or to deter users 1 from making fraudulent access requests 2 to the communications session 11. The pre-processing protocol may be initiated instead of (or in addition to) the integrity enforcement measures 12, 13, 14, 15.

Different to the communication server 10 of FIG. 1, the communication server 10 of FIG. 2 comprises an access integrity module (AID module) 21. This AID module 21 comprises means for initiating an adaptive integrity enhancement sequence (AIE sequence) with the user's device 1.

Further, the system as shown in FIG. 2 comprises a dedicated external access integrity parameter server (AIP server) 20. The AIP server 20 comprises an AIE sequence prompts database 26, an AIE sequence server module 25 for selecting prompts from the database 26 and an API server 23 for communicating with user device 1.

Upon receiving an access request 2 by a user device 1, the AID module 21 initiates the AIE sequence with the user's device 1. The AIE sequence is performed by the AIP server 20 accessed for example over the internet.

The AIE sequence is routed through the AID module 21 of the communications server 10. In this case, it is implemented using an existing protocol such as TCP/IP, with the AID module 21 acting as an API client to the API server module 23 of the AIP server 20. Otherwise, it may be implemented as a dedicated protocol.

Alternatively to the routing through the AID module 21, the AIE sequence exchange may be established directly between the AIP server 20 and the user's device 1, as indicated by reference sign 24.

As will be described below, the AIE sequence server module 25 of the AIP server 20 selects AIE sequence prompts from database 26 in dependence on the progress of the pre-processing exchange with the user's device 1. The AIE sequence prompts are also called access prompts here.

Each AIE sequence prompt in database 26 comprises content for communication or presentation to the user device 1, the content for communication is also called an honesty primer in this invention. Further, each AIE sequence prompt comprises one or more expected user responses, and an adjustment parameter for adjusting an integrity indicator. The adjustment parameter is also called an access integrity parameter adjustment (AIPA) parameter. The adjustment parameter is associated with the particular AIE sequence prompt. The adjustment parameter is used to determine an access integrity (AI) parameter value, here also called an integrity indicator.

In one embodiment of the invention, when the integrity indicator matches or exceeds a predefined condition, the access request 2 to the communications session 11 is established.

In a second embodiment of the invention, the access request 2 is established and the first integrity indicator is passed to the communications session 11, such that the communications session 11 can be performed using a level of integrity surveillance commensurate with the AI parameter value. The calculation of the AIP value will be described in more detail below.

Through use of a system as disclosed in FIG. 2, the occurrence of unwanted user interaction patterns a posteriori can be reduced a priori, thereby reducing the amount of post-processing 14, 15 required.

Further, the determination of the integrity of the access requests 2 allows for adjusting the allocation of resources applied to each request:

Access requests 2 which are determined to be of higher integrity are routed to the communications session 11 within a shorter time (e.g. 5 seconds), thereby reducing processing requirements of the system as a whole.

Access requests 2 which are determined to be of lower integrity may also be routed to the communications session 2 within a relatively short time (e.g. 10 to 15 seconds), but in this case the access integrity parameter may be passed to the communications session 11 such that the communications server 10 adapts a security level or a stringency of integrity tests carried out on the user's interactions with the communications session 11. In this way, a communications server 10 handling many thousands of access requests 2 per hour or per minute can automatically optimize the allocation of its processing resources (e.g. pattern recognition, which is highly processor intensive) to access requests 2 which have lower integrity indicator.

Figure 3:
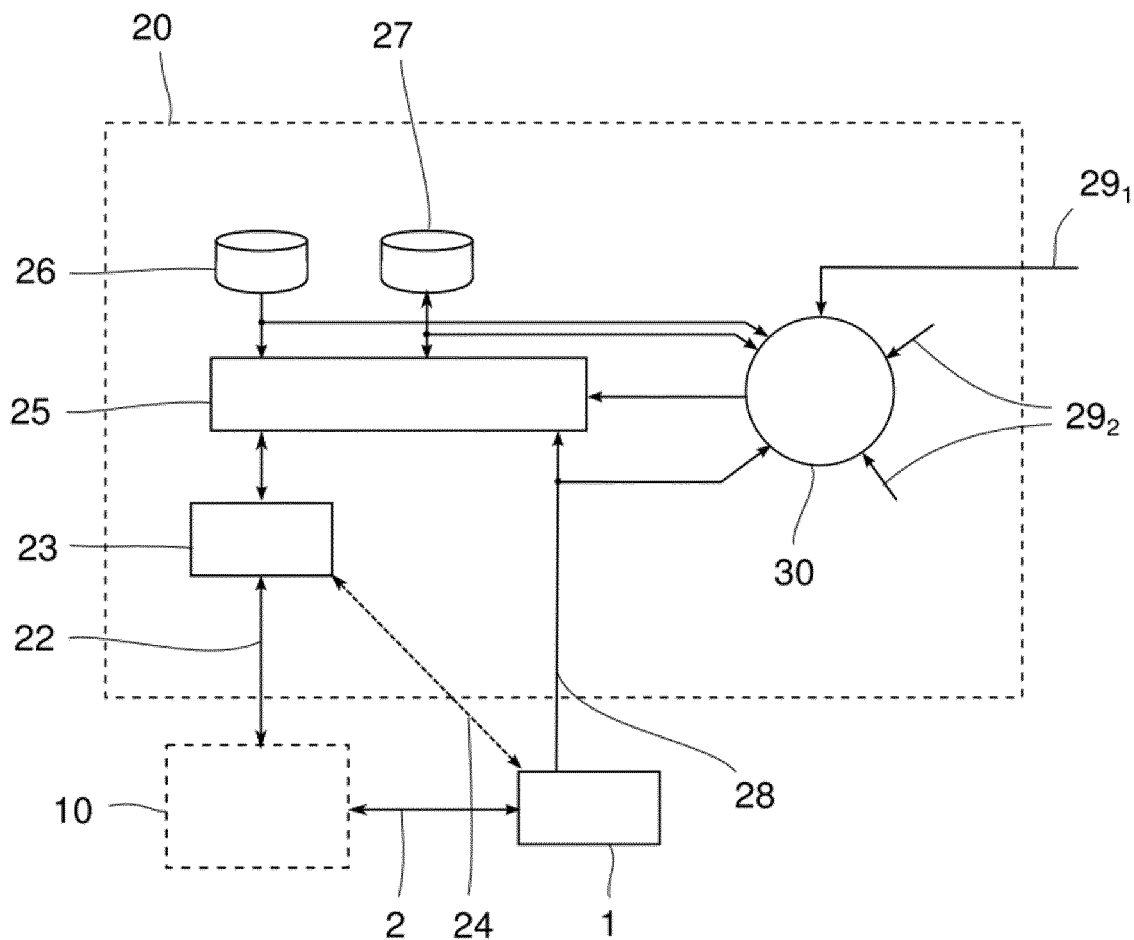
FIG. 3 shows a schematic view of a second example of a system according to the invention.

FIG. 3 shows a schematic view of a second example of an AIP server 20. This AIP server 20 also comprises an AIE sequence prompts database 26, an AIE sequence server module 25 for selecting access prompts from the database 26 and an API server 23 for communicating with user device 1 as mentioned in relation to FIG. 2. Additionally, this AIP server 20 comprises a machine learning model 30 for optimizing the AIE sequence and a data storage 27.

As in the example illustrated in FIG. 2, the AIE sequence server module 25 selects access prompts from the prompt database 26, for communication to the user device 1 via an API server 23. Access prompts are selected according to an adaptive sequence, determined by the machine learning model 30.

Metadata 28 is provided from the user's device 1 to the AIE sequence server module 25 as predictor input to the machine learning model 30. Such metadata 28 includes, for example, an originating IP address of the user's device 1, or a geographical region or location associated with the IP address, and a local time of day at the geographical region or location.

Further, predictor parameters $29_1$ and $29_2$ may also be used as predictor variables for the machine learning model 30. Their use depends on what is required by the particular type of communications session 11 for which the access request 2 is being pre-processed, and which parameters have been used to train the model.

Predictor parameter $29_1$ indicates verification data fed back from post-processing verification module 14 of communications server 10. Parameter $29_1$ is used for ongoing training of the model 30: With each newly available training dataset $29_1$ the model 30 is automatically updated. For this, the API client 21 and the API server 23 include the necessary instructions for coordinating the feedback of outcome data verified by module 14 with the corresponding predictor data.

Using the model 30 in this way, an estimated updated value 31 of the AI parameter, also called a second integrity indicator 31, is generated for each successive access prompt communicated to the user device 1. The second integrity indicator 31 is based on at least one of
  the metadata,
  a prompt identifier of the prompt,
  a user response content,
  user response behavior parameters (e.g. temporal characteristics).

The second integrity indicator 31 is used by the AIE sequence server module 25 to decide whether the access request 2 should be established or not. If it is to be established, the current integrity indicator is provided to the communications session 11 as described above. Alternatively, or in addition, the model 30 may be used to generate a selection of the next access prompt to transmit to the user device 1, thereby generating an optimized sequence of access prompts for optimizing the integrity indicator under the particular conditions and response of the access request 2 being pre-processed.

Further, historical data of the access request are stored in data storage 27. Historical data include, for example, previously-presented access prompts, previous user-responses, and/or previous user response patterns. User response patterns include temporal information such as the speed or duration of a user response, or an input stroke (e.g. keystroke) pattern.

According to one variant, a time delay between presentation time of an access prompt and a start of a user response may be taken as a time taken by the user to read a message of the access prompt, and this delay parameter may be combined with information about the length and/or complexity of the message to calculate a baseline reading speed of the user presenting the access request 2. The calculated baseline reading speed may be used to weight subsequent temporal user response parameters.

Figure 4:
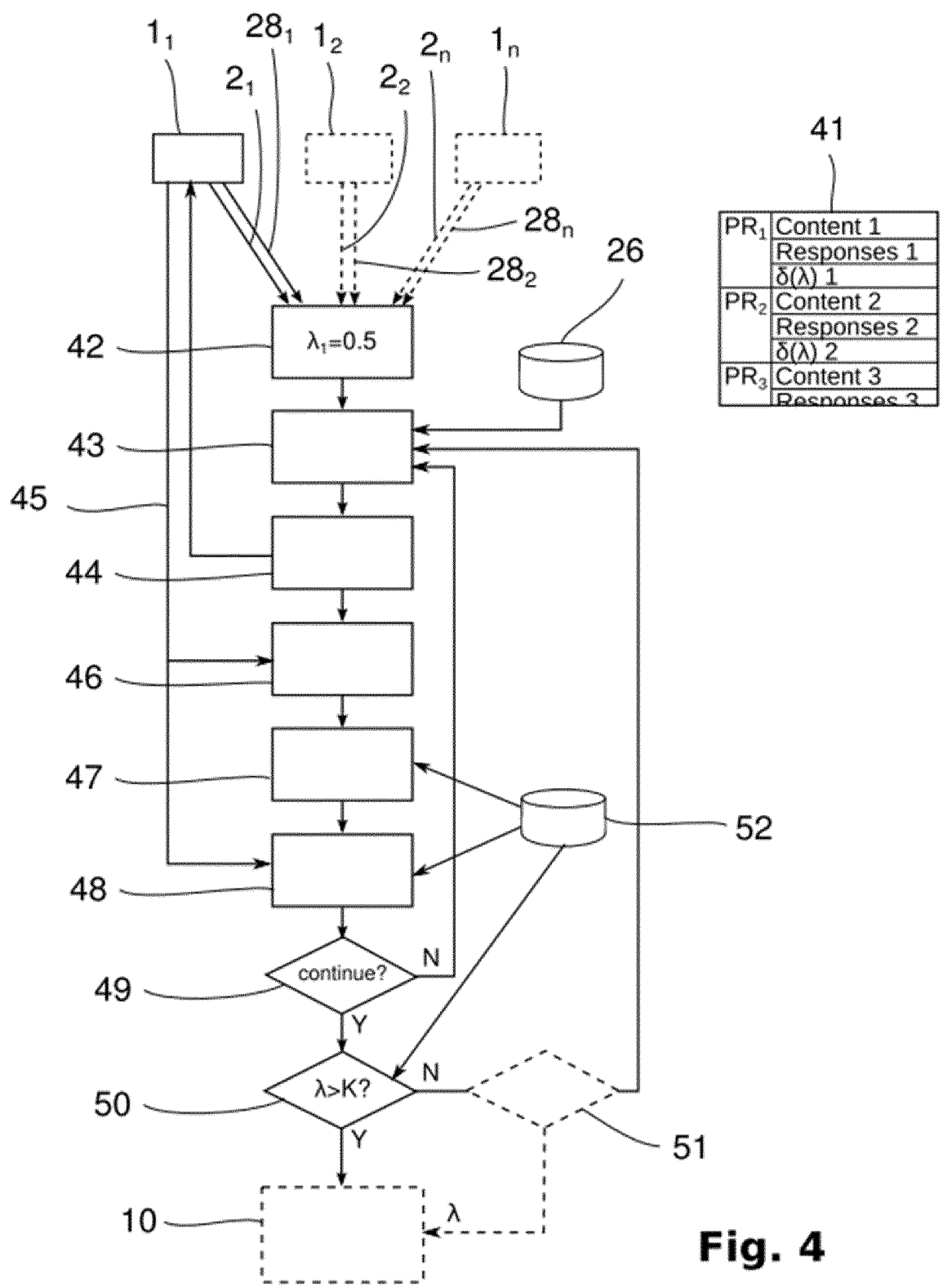
FIG. 4 shows a simplified flow diagram of a first example of a method according to the invention.

FIG. 4 shows a first example of a method according to the invention.

The process is started by multiple users $1_1$, $1_2$, $1_n$ making multiple access requests $2_1$, $2_2$, $2_n$ to communications session 11.

In a first step 42, a first integrity indicator λ1, in particular a first value of an access integrity parameter is determined. For example, access request $2_1$ is received from user device $1_1$. At step 42, the first integrity indicator $\Delta_1$ is first assigned to the access request $2_1$. In this example, the first integrity indicator $\lambda_1$ is assigned an initial predetermined value of 0.5, although other initial values could be used. The first integrity indicator is assigned on the basis of metadata 28 from the user device $1_1$, using rules in a knowledge base (not shown).

In step 43 a succession of access prompts 41 are selected from access prompt database 26. Each access prompt comprises a content, one or more expected user responses, and an adjustment parameter δ(λ). The content and nature of the access prompts are varied so that some access prompts effect greater enhancement of the integrity indicator of the access request 2 than others, and are therefore associated with larger values of the adjustment parameter δ(λ).

In step 44, the selected access prompt 41 is communicated to the user device 11, and the user response 45 is received in step 46. In step 47, the current integrity indicator λ is updated by an amount determined by the adjustment parameter δ(λ) as a function of the content of the user response 45, with reference to rules in knowledge base 52. In step 48, the current integrity indicator λ is updated by an amount determined by the adjustment parameter δ(λ) as a function of the user response pattern, information of the user response 45, with reference to rules in knowledge base 52. Step 49 provides an option for pausing the process, which may optionally entail an additional adjustment (not shown) of the integrity indicator λ. If the process is paused, it will be reset to step 43 with a new integrity indicator λ, selected to take into account the user's decision to pause. At step 50, if the integrity indicator λ of the AIP is greater than a predetermined value K, the access request 2 is routed to the communications session 11. If not, then the process iterates with a new access prompt 41 selected from database 26. The condition K for progress to the communications session 11 may be a numerical threshold, or it may be a function of the various available parameters (metadata 28, access prompt selection, historical data, user response content, user response pattern etc.) and rules in the knowledge base 52.

According to one variant of the invention, the adjustment parameter δ(λ) is defined not as a numerical value but as a function of a different parameter such as one or more of the temporal characteristics of the user response.

Optionally, the access request 2 may be routed 51 to the communications session 11 with the integrity indicator λ being passed as a parameter for use by the communications session 11, as described above.

Figure 5:
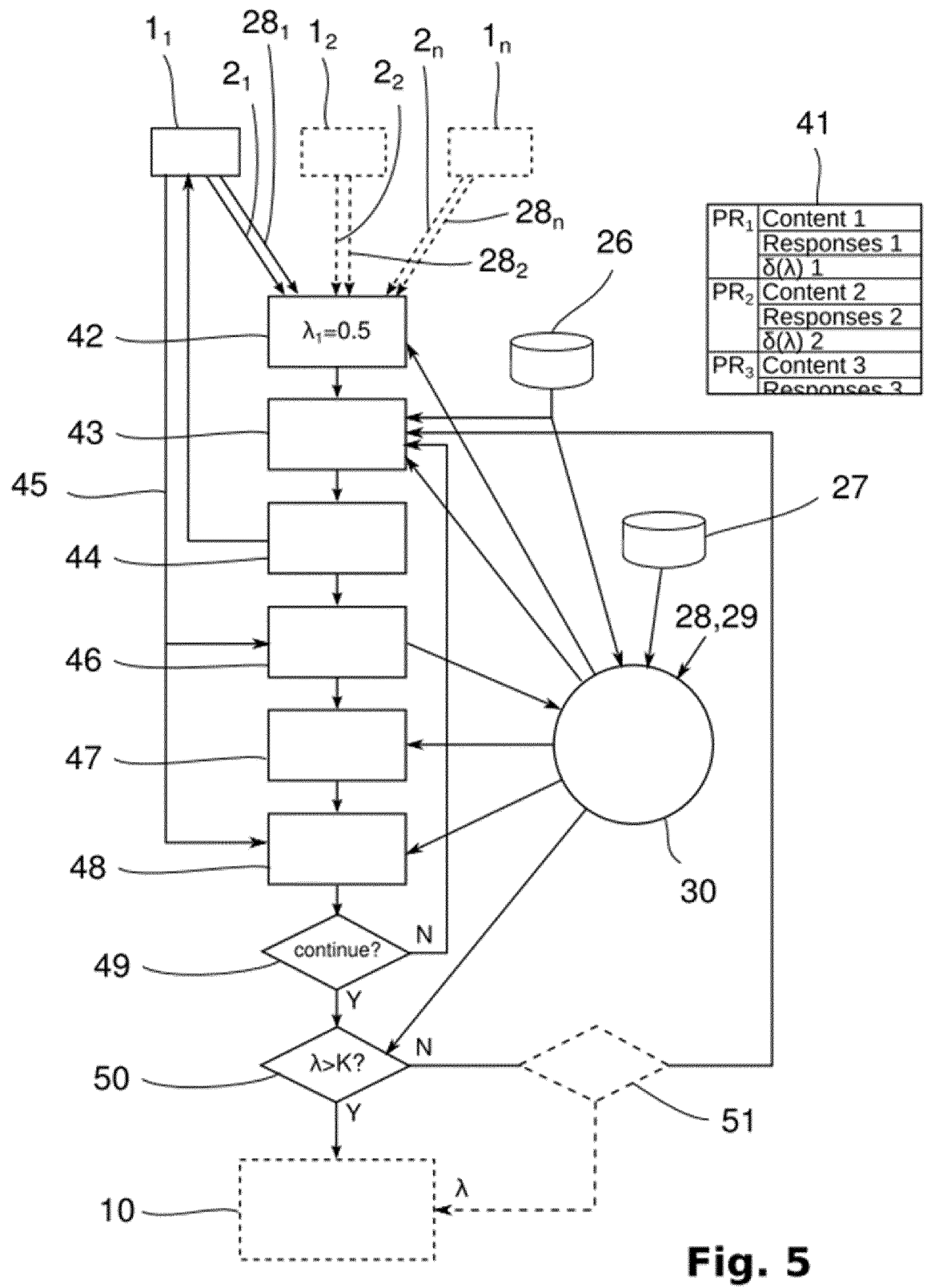
FIG. 5 shows a simplified flow diagram of a second example of a method according to the invention.

FIG. 5 shows a variant of the method of FIG. 4, in which the pre-processing of the access requests 2 is carried out under control of a machine-learning model 30. In this case the model is trained using conventional supervised machine learning techniques, using metadata 28, historical access request parameters (metadata 28, prompt selection, historical data, user response content, user response patterns, pause events etc.) and records of the corresponding integrity outcomes. Model 30 takes as its predictors one or more of the metadata 28, the current access prompt selection, content and pattern of the current user response 45, historical data 27 of the access request 2 including previous access prompt selections, previous AIP values, previous user responses, previous user response patterns, and/or bespoke parameters 29. Output response variables of the model 30 are the adjustment parameter, a selection of the next access prompt to be communicated to the user device 1, and/or a predetermined value K of the condition for transferring the access request 2 onward to the communications session 11 of communications server 10.

Figure 6A:
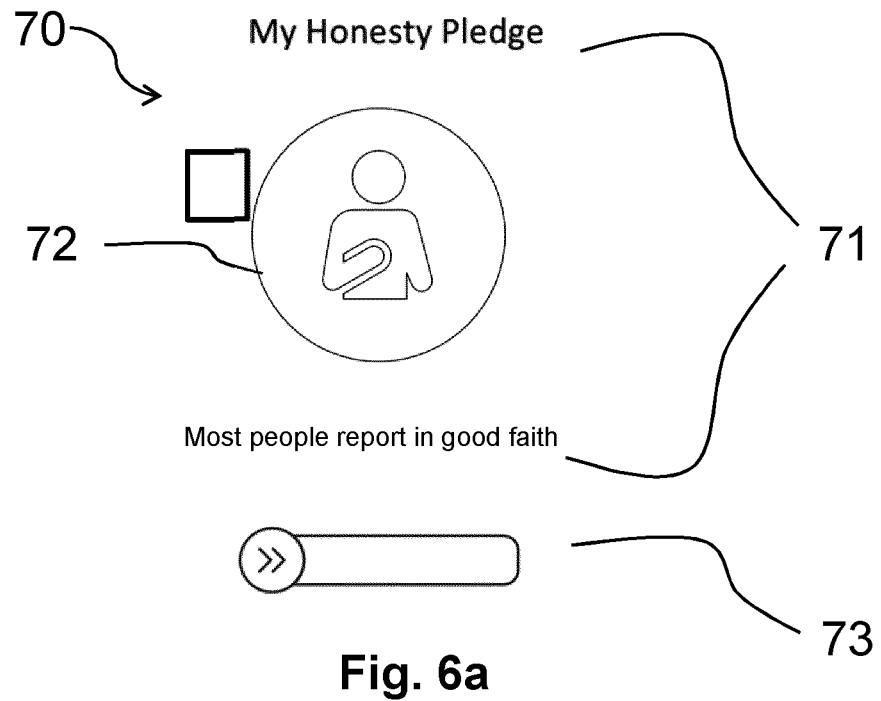
FIG. 6a shows a representation of an honesty primer.

FIG. 6a shows a representation of an honesty primer 70. The honesty primer 70 comprises a message 71 with a title "My honesty pledge" and a text body "Most people report in good faith". Further, the honesty primer 70 comprises an icon 72 and an exercise, in this case a slider 73.

Figure 6B:
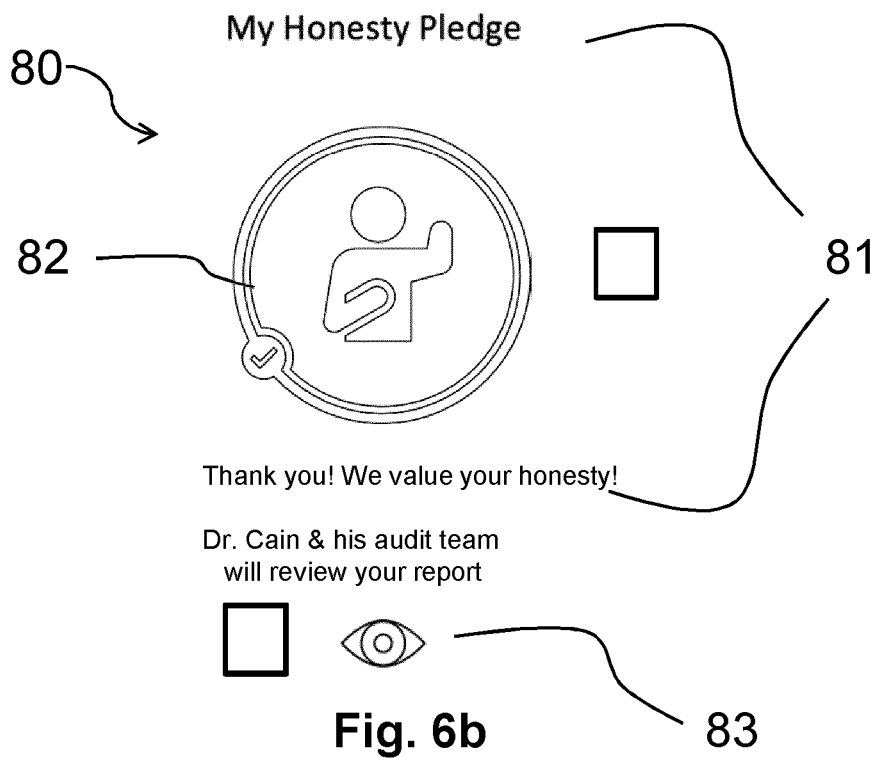
FIG. 6b shows a representation of an adapted honesty primer.

FIG. 6b shows a representation of an adapted honesty primer 80 in case of the integrity score being met and the user being transferred to the communication session. The adapted honesty primer 80 also comprises a message 81, icon 82. Both the message 81 and the icon 82 are adapted compared to the message 71 and the icon 72. The message 81 shares the same title "My honesty pledge" as the message 71, but comprises an adapted text body "Thank you. We value your honesty! Dr. Cain& his audit team will review your report". Further, the exercise 73 is exchanged with an icon 83.

Figure 7:
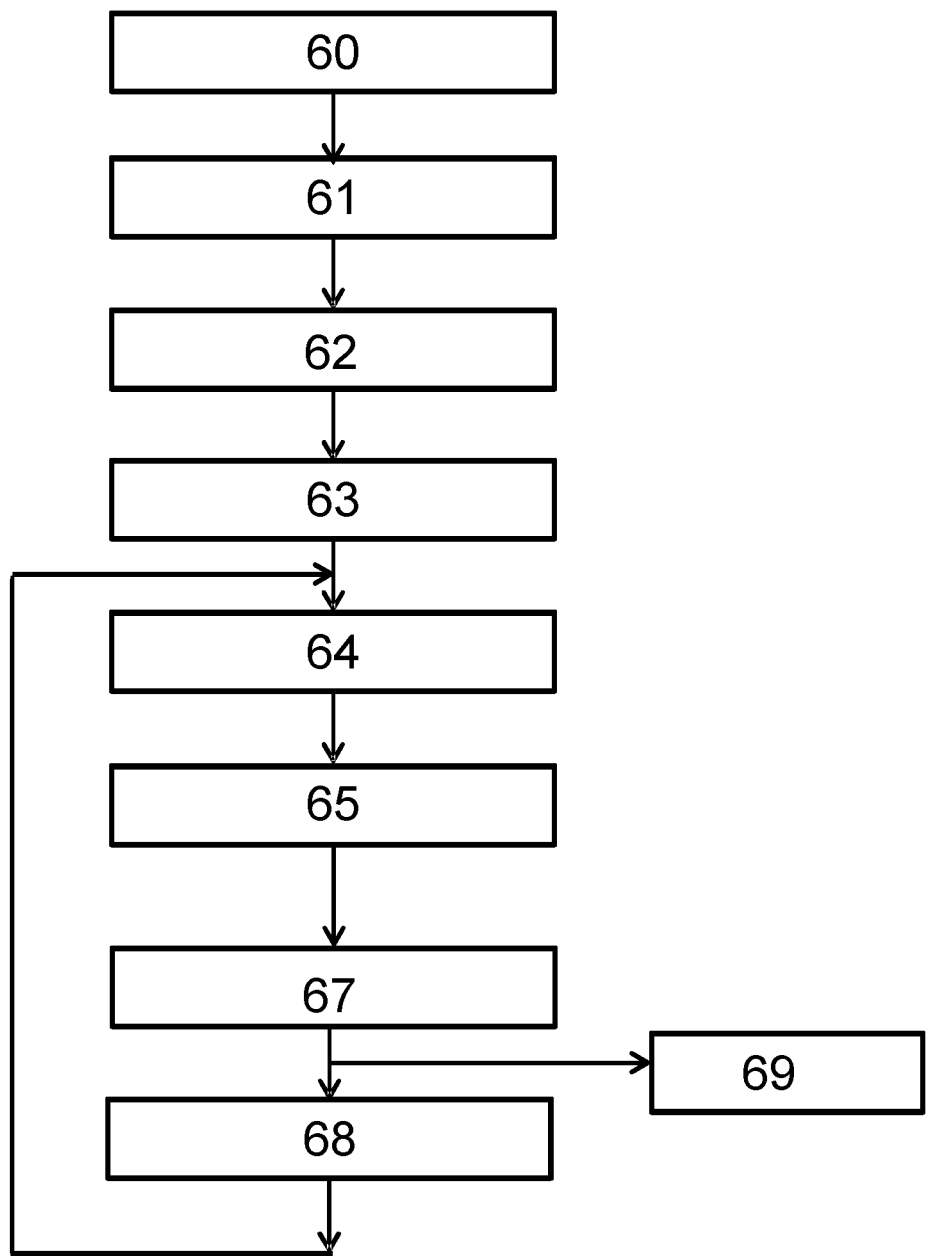
FIG. 7 shows a diagram of a method of pre-processing a user access request to an online communications session.

FIG. 7 shows a diagram of a method of pre-processing a user access request to an online communications session. The user wants to join a communication session and tries to access a webpage. This starts the process, as in the first step 60 the user device sends the access request for a communication session to the server. In the next step 61, the self-learning computer program determines a first integrity indicator ($\lambda_1$) (see FIGS. 4 and 5) to determine the level of expected honesty of the user in the communication session. For this, the self-learning computer program uses the metadata of the access request. Specifically, the self-learning computer program uses reliability parameters of the metadata to determine the first integrity indicator ($\lambda_1$) (see FIGS. 4 and 5). These reliability parameters are at least one of geolocation, browser language, time, Interaction with previous pre-communication and/or communication sessions Integrity indicators of previous pre-communication sessions and/or communication sessions.

In the next step 62, the user is transferred to a pre-communication session. The pre-communication session is a session accessed before the actual communication session. The predetermined condition is set by the self-learning program structure to allow users determined to be more honest easy access while leading the users determined to be less honest into the pre-communication session to influence their behaviors in the communication session.

Such an implementation of the influence using a pre-communication session allows the method to be adapted to various processes and thus is easily integrated into different applications.

In the following step 63 the self-learning program structure selects an honesty primer (70, 80, see FIG. 6a, 6b) out of a data base and determines a second integrity indicator ($\lambda_2$, see FIGS. 4 and 5). The honesty primer is adapted to the first integrity indicator and may be adapted to further parameters, especially according to the reliability parameter, such as different languages according to browser language, time of day etc.

For example, an algorithm as represented in the following table may be used to adapt the honesty primer:

| CPI Index | Time Stamp | Hesitation | Risk | Smiley | Eye | Message |
|---|---|---|---|---|---|---|
| 1-50 | 6am-12pm | 1-3 secs | 90-100 | Happy | No | No |
|  | 12pm-6am | 1-3 secs | 80-90 | Happy | No | No |
| 100+ | 6am-12pm | 0.5-3 secs | 60-80 | Indifferent | yes | No |
|  | 12pm-6am | 0-0.5 secs | 0-60 | sad | No | yes |

CPI = Transparency International: Corruption Perception Index

The honesty primer is a message and/or an action and/or an exercise. For example, the user may be presented with an honesty primer as described in FIG. 6.

The honesty primer is stored with an adjustment parameter and an expected user response as an access prompt in the data base. The adjustment parameter relates the indication of how much the integrity indicator is expected to change by showing the honesty primer. This allows for an easy calculation of the second integrity indicator.

The expected user response relates to the user reaction which is supposed to be provoked by the honesty primer. In the example of the FIG. 6, the honesty primer of a slider is supposed to provoke the user to swipe the slider at a certain speed. Thus, if the slider is swiped too quickly, the provoked user reaction and the expected user response is not the same. This allows for an easy way of describing, if the honesty primer worked as intended.

In the following step 64 the honesty primer is sent to the user device. The honesty primers are communicated based on java script events and/or call backs to the parent site.

The user response and response content are sent to the server in step 65. This allows for the self-learning computer program in step 66 to analyze the user response and the response content as response behavior parameters and determine a third integrity indicator.

In step 67, the first, second and third integrity indicator, as well as user response pattern and information of the user response (45, see FIGS. 4 and 5), are used to determine an integrity score of the user. The integrity score is compared to a predetermined condition, whether access to the communication server is allowed for this user or denied. The self-learning computer program adapts and determines the condition, whether the access is granted.

In the following table, different scenarios for the integrity indicator are presented:

| Scenarios | Time of day | Speed before pledge start | Speed to pledge | Speed after pledge |
|---|---|---|---|---|
| Total number of combinations with current intervals (n = 108): daily time intervals (4) x speed before pledge start (3) x speed to pledge (3) x speed after pledge (3) | 6AM-12PM-4PM-8PM-6AM | FAST/ MEDIUM/ SLOW | FAST/ MEDIUM/ SLOW | FAST/ MEDIUM/ SLOW |

| Scenarios | Time of day | Speed before pledge start | Speed to pledge | Speed after pledge |
|---|---|---|---|---|
| Doesnt realise purpose of pledge or doesn't care | 6AM-12PM | FAST | FAST | FAST |
|  | various combinations | FAST | FAST | SLOW |
|  | various combinations | FAST | SLOW | SLOW |
|  | various combinations | FAST | SLOW | FAST |
|  | various combinations | SLOW | SLOW | SLOW |
|  | various combinations | SLOW | FAST | FAST |
|  | various combinations | SLOW | SLOW | FAST |
|  | various combinations |  |  | SLOW |

Shorter times show a quicker pace of the user going through the pre-communication session and thus show a higher risk at dishonesty.

The integrity indicator is used to indicate, if a user is indicated to be more honest. Thus, the integrity indicator is lower in users considered to be less honest. For example, a first user later in the day may show a lower integrity indicator, as experiments have shown, that users later in the day are statistically more dishonest. The different measured response parameters are used to calculate an integrity indicator, which are used to calculate the overall integrity score.

Examples for the calculation of the integrity score of two users are shown in the following two-part table:

| Scenarios | Time of day (0-25 points) | Speed before pledge start (0-25 points) | Speed to pledge (0-25 points) |
|---|---|---|---|
| User 1 | 5pm (15 points) | 0.24 secs. (10 points) | 0.31 secs. (10 points) |
| User 2 | 9am (25 points) | 1.02 (25 points) | 0.73 secs (20 points) |
| Scenarios |  |  |  |
| User 1 |  |  |  |
| User 2 |  |  |  |

In step 68, as the integrity score does not meet the predetermined condition, the honesty primer is adapted.

The honesty primers (70, 80 FIGS. 6a, 6b) are customizable either by an algorithm using machine learning to adapt the honesty primer to enhance the effectiveness and/or by the customer. Customizable are in particular text content, colors, sequence, interaction methods (i.e. swipe, puzzle, fingerprint etc.), continue button and duration of display.

The adapted honesty primer is then sent to the user device, and the process starts anew on step 64.

In step 69, the integrity score meets the predetermined condition (κ) (see FIGS. 4 and 5) and the user is transferred to the communication session.

For executing the method a system, for example as shown in FIG. 5, is used. The software implementation comprises a java script widget, which can be used for mobile and browser versions and is thus easily integratable into existing processes.

Figure 8:
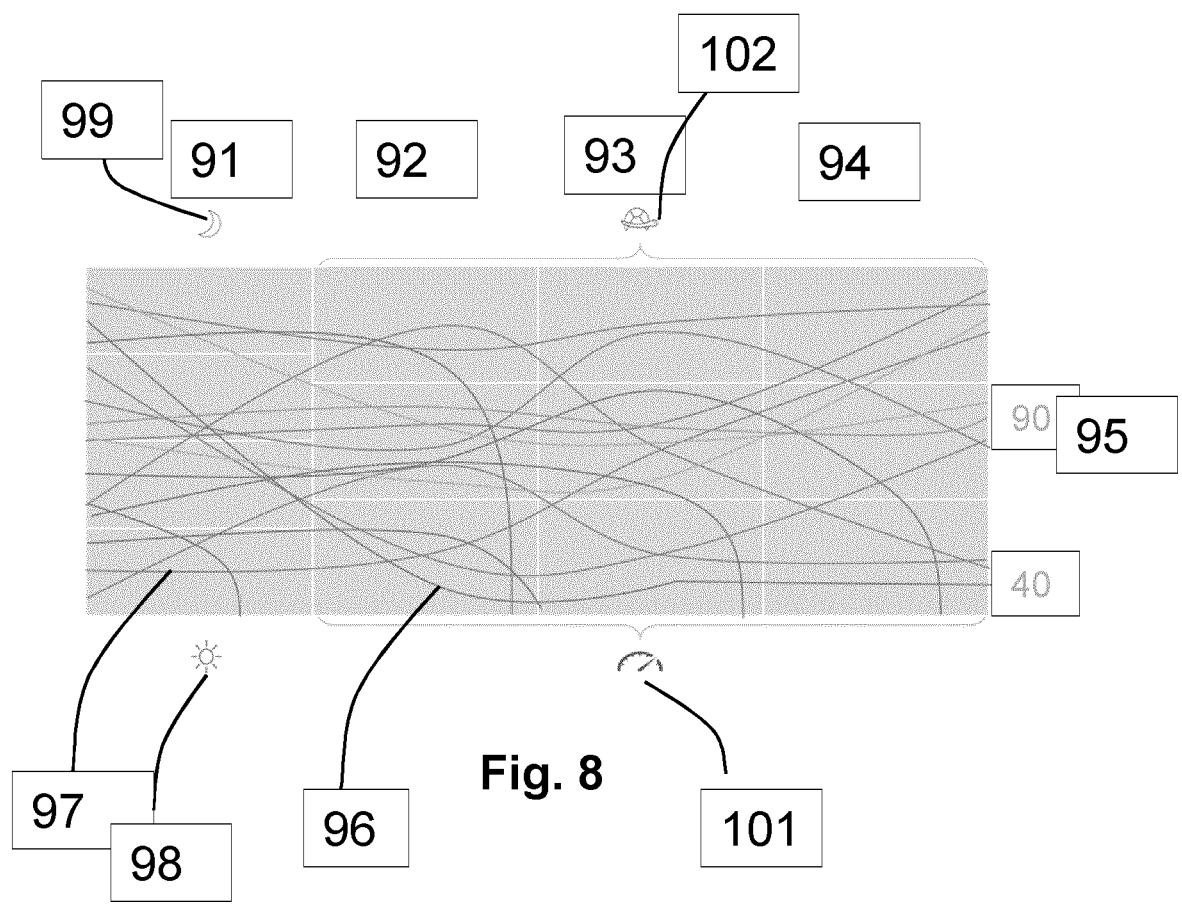
FIG. 8 shows a diagram of data points used to calculate an integrity score.

FIG. 8 shows an example diagram of the data points used for the assessment of the integrity score 95. The data point of the metadata used in this example is the time of day 91. The data points of the response behavior parameters used are the time until starting the interaction 92 with the honesty primer, the interaction speed 93 with the honesty primer and the time to continue 94 to the communication session. The data points are used to determine integrity indicators, which are used to select and adapt the honesty primer. Thus, for example, a user sending an access request later 99 in the day will get a different honesty primer to another user sending an access request early 98 in the morning.

It has been shown, that communication sessions in the afternoon, fast pre-communication sessions and above-average hesitation to continue to the communication session are each predictive of dishonesty. Thus, this data points are used to initially assess the integrity score of a user. For example, a user 96 in the afternoon, with faster 101 than usual interaction with the honesty primer, has a lower integrity score than a user 97 early in the morning with slower 102 interaction speed.

Further, through users found to be dishonest after a communication session, this assessment is adjusted. Further data points or combinations of data points, that predict dishonesty as the model will confirm, reject, adapt or suggest new combinations of above data that will predict dishonesty.

With feedback about users who have been found to be dishonest, the self-supervised learning structure will analyze and learn the metadata and behavioral data from those users, to adapt algorithm for predicting dishonesty and apply these findings to others.

The invention claimed is:

1. A computer-implemented method of pre-processing a user access request to an online communications session, the method comprising the steps of:
   transferring the user to a pre-communication session,
   communicating an honesty primer to the user, the honesty primer includes at least a message and/or action and/or exercise,
   transferring the user to the communication session,
   Wherein the method comprises the steps:
   before transferring the user to the pre-communication session, determining a first integrity indicator of a user sending an access request to a communication server based on metadata of the access request, including the first integrity indicator is determined based on reliability parameters of the metadata, which include at least one of:
   geolocation,
   browser language,
   time,
   interaction with previous pre-communication and/or communication sessions
   integrity indicators of previous pre-communication sessions and/or communication sessions,
   and/or the steps:
   analyzing user interaction with the pre-communication session,
   determining a third integrity indicator based on the analysis;
   further comprising the steps of:
   determining an integrity score based on the first integrity indicator and/or second integrity indicator and/or third integrity indicator,
   transferring the user to the communication session if the integrity score meets a predetermined condition and/or:
   adapting the pre-communication session.

2. The method according to claim 1, comprising the steps of:
   analyzing the interaction of the user with the adapted honesty primer,
   determining a fourth integrity indicator, and/or fifth integrity indicator based on the analysis,
   analyzing the first integrity indicator and/or the second integrity indicator and/or the third integrity indicator and/or a fourth integrity indicator and/or fifth integrity indicator,
   determining an integrity score based on the analysis and only in case of the integrity score meeting a predetermined condition (κ), transferring the user to the communication session.

3. The method according to claim 1, comprising the steps of:
   collecting sensor data, including camera and/or microphone data,
   analyzing the sensor data and determine reliability parameters based on the analysis.

4. The method according to claim 1, comprising the steps of:
   providing a database of access prompts, each access prompt comprising an honesty primer, an indication of an expected user response and an adjustment parameter for adjusting an integrity indicator,
   selecting one or more access prompts of the data base based on the first integrity indicator.

5. The method according to claim 1, comprising the steps of:
   providing a self-learning computer program structure for analyzing reliability parameters and/or adjustment parameters and/or response behavior parameters and/or user response content and/or security parameters,
   analyzing reliability parameters and/or adjustment parameters and/or response behavior parameters and/or user response content and/or security parameters,
   determining the first integrity indicator of the user by the self-learning computer program structure based on the analysis,
   selecting and/or adapting the one or more honesty primers based on the analysis by the self-learning computer program structure.

6. The method according to claim 5, the method comprising the steps of:
   analyzing the interactions of multiple users with pre-communication sessions and/or communication sessions, including for negative interaction patterns, by the self-learning computer program structure,
   based on this analysis determining the first integrity indicator of a single user,
   selecting an access prompt based on the first integrity score.

7. The method according to claim 6, comprising the following steps:

receiving a content of a user response to the access prompt, determining a second integrity indicator based on the adjustment parameter of the access prompt and at least one of the first integrity indicator, a previous integrity indicator, and the content of the user response, determining a response behavior parameter of the user response, the response behavior parameter including a temporal characteristic of the user response, determining a third integrity indicator based on the determined response behavior parameter, determining an integrity score based on at least one of the third integrity indicator, a difference between the second and the third integrity indicator, an identifier of the access prompt presented to the user, and the content or behavior parameter of the user response, if the integrity score meets a predetermined condition, transferring the user access to the communications session.

8. The method according to claim 5, wherein the self-learning computer program structure is trained using predictor variables, the predictor variables are at least one of:
the metadata,
historical values of the network locations,
the geographical locations,
the times of day, identifiers of access prompts presented,
the user responses,
the access integrity parameter and/or user responses, each response comprising a response content and one or more response behavior parameters.

9. The method according to claim 5, wherein the self-learning computer program structure is continuously trained.

10. The method according to claim 5 comprising using the machine learning model to determine the said predetermined condition.

11. The method according to claim 1, comprising the steps of:
analyzing user interaction with the pre-communication session, including with the honesty primer, by a self-learning computer program structure, including analyzing reliability parameters and/or adjustment parameters and/or response behavior parameters and/or user response content,
determining the second and/or third integrity score of the user by the self-learning computer program structure based on the analysis,
adapting the pre-communication session according to the second and/or third integrity indicator, by the self-learning computer program structure.

12. A computer-readable medium comprising instructions which, when executed by a computer, cause the computer to carry out the method of claim 1.

13. A computer-implemented method of pre-processing a user access request to an online communications session, the method comprising the steps of:
transferring the user to a pre-communication session,
communicating an honesty primer to the user, the honesty primer includes at least a message and/or action and/or exercise,
transferring the user to the communication session,
Wherein the method comprises the steps:
before transferring the user to the pre-communication session, determining a first integrity indicator of a user sending an access request to a communication server based on metadata of the access request, including the first integrity indicator is determined based on reliability parameters of the metadata, which include at least one of:
geolocation,
browser language,
time,
interaction with previous pre-communication and/or communication sessions
integrity indicators of previous pre-communication sessions and/or communication sessions,
and/or the steps:
analyzing user interaction with the pre-communication session,
determining a third integrity indicator based on the analysis;
further comprising the steps of
analyzing the interaction of the user with the adapted honesty primer,
determining a fourth integrity indicator, and/or fifth integrity indicator based on the analysis,
analyzing the first integrity indicator and/or the second integrity indicator and/or the third integrity indicator and/or a fourth integrity indicator and/or fifth integrity indicator,
determining an integrity score based on the analysis and only in case of the integrity score meeting a predetermined condition ($\kappa$), transferring the user to the communication session.

14. A computer-implemented method of pre-processing a user access request to an online communications session, the method comprising the steps of:
transferring the user to a pre-communication session,
communicating an honesty primer to the user, the honesty primer includes at least a message and/or action and/or exercise,
transferring the user to the communication session,
Wherein the method comprises the steps:
before transferring the user to the pre-communication session, determining a first integrity indicator of a user sending an access request to a communication server based on metadata of the access request, including the first integrity indicator is determined based on reliability parameters of the metadata, which include at least one of:
geolocation,
browser language,
time,
interaction with previous pre-communication and/or communication sessions
integrity indicators of previous pre-communication sessions and/or communication sessions,
and/or the steps:
analyzing user interaction with the pre-communication session,
determining a third integrity indicator based on the analysis;
further comprising the steps of:
providing a database of access prompts, each access prompt comprising an honesty primer, an indication of an expected user response and an adjustment parameter for adjusting an integrity indicator,
selecting one or more access prompts of the data base based on the first integrity indicator.

15. A computer-implemented method of pre-processing a user access request to an online communications session, the method comprising the steps of:

transferring the user to a pre-communication session,
communicating an honesty primer to the user, the honesty primer includes at least a message and/or action and/or exercise,
transferring the user to the communication session,
Wherein the method comprises the steps:
before transferring the user to the pre-communication session, determining a first integrity indicator of a user sending an access request to a communication server based on metadata of the access request, including the first integrity indicator is determined based on reliability parameters of the metadata, which include at least one of:
geolocation,
browser language,
time,
interaction with previous pre-communication and/or communication sessions
integrity indicators of previous pre-communication sessions and/or communication sessions,
and/or the steps:
analyzing user interaction with the pre-communication session,
determining a third integrity indicator based on the analysis;
further comprising the steps of:
providing a self-learning computer program structure for analyzing reliability parameters and/or adjustment parameters and/or response behavior parameters and/or user response content and/or security parameters,
analyzing reliability parameters and/or adjustment parameters and/or response behavior parameters and/or user response content and/or security parameters,
determining the first integrity indicator of the user by the self-learning computer program structure based on the analysis,
selecting and/or adapting the one or more honesty primers based on the analysis by the self-learning computer program structure.

16. A computer-implemented method of pre-processing a user access request to an online communications session, the method comprising the steps of:

transferring the user to a pre-communication session,
communicating an honesty primer to the user, the honesty primer includes at least a message and/or action and/or exercise,
transferring the user to the communication session,
Wherein the method comprises the steps:
before transferring the user to the pre-communication session, determining a first integrity indicator of a user sending an access request to a communication server based on metadata of the access request, including the first integrity indicator is determined based on reliability parameters of the metadata, which include at least one of:
geolocation,
browser language,
time,
interaction with previous pre-communication and/or communication sessions
integrity indicators of previous pre-communication sessions and/or communication sessions,
and/or the steps:
analyzing user interaction with the pre-communication session,
determining a third integrity indicator based on the analysis;
further comprising the steps of:
analyzing user interaction with the pre-communication session, in particular with the honesty primer, by the self-learning computer program structure, especially analyzing reliability parameters and/or adjustment parameters and/or response behavior parameters and/or user response content,
determining the second and/or third integrity score of the user by the self-learning computer program structure based on the analysis,
adapting the pre-communication session according to the second and/or third integrity indicator, by the self-learning computer program structure.

* * * * *